Dec. 8, 1953  R. K. SKINNER  2,661,649
BOLT ANCHOR WITH SPRING ROTATION PREVENTING MEANS
Filed April 20, 1950
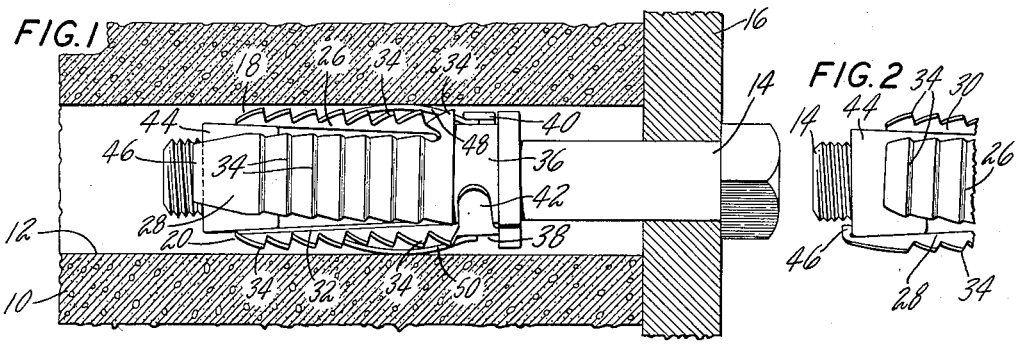
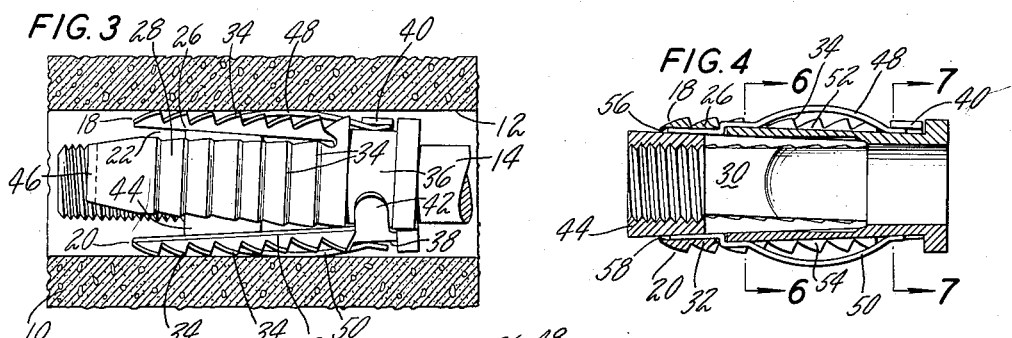
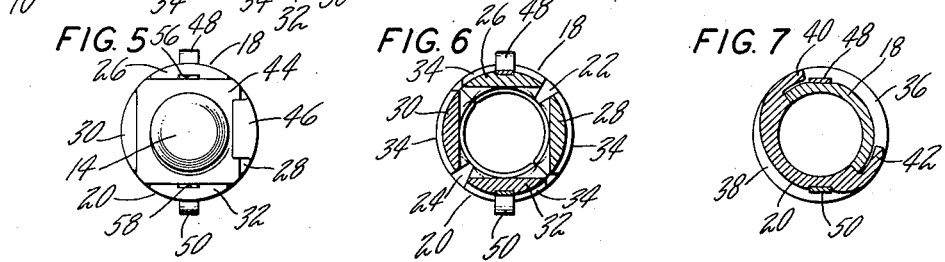
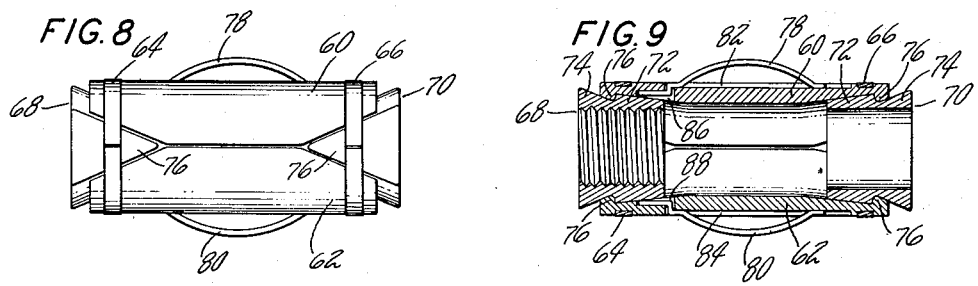
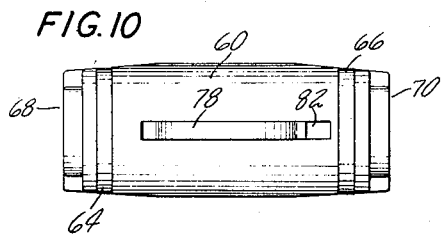
INVENTOR
ROBERTS K. SKINNER
BY *S. Jay Teller*
ATTORNEY Patented Dec. 8, 1953

2,661,649

UNITED STATES PATENT OFFICE 2,661,649

BOLT ANCHOR WITH SPRING ROTATION PREVENTING MEANS

Roberts K. Skinner, West Hartford, Conn.

Application April 20, 1951, Serial No. 222,108

2 Claims. (Cl. 85—2.4)

The invention relates to bolt anchors of the expansible type which are designed to be located in holes in walls, ceilings, floors and the like for receiving the threaded ends of bolts that are to secure in place objects such as signs, conduits, machinery and the like.

Holes drilled in brittle materials, such as brick and concrete, to receive such anchors are unavoidably liable to be conical in shape near the mouth due to chipping. Certain commonly used anchors are designed to grip the inner surface of the hole immediately adjacent its mouth where the conical shape of the hole provides an inefficient gripping surface. With such prior constructions it frequently happens, especially if the anchor does not tightly fit the hole, that the anchor rotates with the bolt when the bolt is turned for expanding the anchor, the result being that the shell or expansion members of the anchor are not caused to move outwardly to grip the surface of the hole. It also frequently happens that the anchor does not rotate with the bolt as last above-mentioned, but that the entire anchor nevertheless moves longitudinally without expansion by the expansion nut as the said nut is longitudinally moved by the bolt toward the mouth of the hole. The anchor is thus moved away from its desired position until it reaches the mouth of the hole where it is caused to expand due to pressure against the object to be held.

Some of the difficulties incident to the commonly used prior bolt anchors are eliminated when such anchors incorporate the invention disclosed and claimed in my Patent No. 2,399,069 dated April 23, 1946. As disclosed in the patent, spring fingers or springs are provided on the anchor, these fingers or springs projecting toward the mouth of the hole and engaging at their ends with the surface of the hole. The said fingers or springs bite into the said surface to prevent rotative movement of the anchor and also to prevent longitudinal movement thereof toward the mouth of the hole.

The general object of the present invention is to provide a bolt anchor having some of the features set forth in the said patent and also having certain additional advantages.

A more specific object of the present invention is to provide a bolt anchor of the character set forth in the patent wherein the springs are so formed and positioned that they engage the surface of the hole between their ends, thus frictionally resisting longitudinal movement without positively preventing it.

Another more specific object of the present invention is to provide a bolt anchor of the character set forth in the patent wherein the springs are located between the ends of the anchor, thus making it possible for the anchor to have any desired longitudinal position irrespective of the springs. The springs when engaged with the surface of the hole serve to bias the expansion members toward their inner unexpanded positions.

Other specific objects of the invention will be apparent from the drawing and from the following description and claims.

In the drawing I have shown in detail two embodiments of the invention, but it will be understood that various changes may be made from the constructions shown, and that the drawing is not to be construed as defining or limiting the scope of the invention, the claims forming a part of this specification being relied upon for that purpose.

Of the drawing:

Fig. 1 is a side view of an unexpanded bolt anchor embodying the invention together with an associated bolt, the anchor and bolt being shown in a hole in a wall with a member in position to be held by the bolt.

Fig. 2 is a fragmentary top view of portions of the anchor and bolt.

Fig. 3 is a fragmentary view similar to Fig. 1, but with the bolt anchor expanded.

Fig. 4 is a vertical longitudinal sectional view of the anchor as shown in Fig. 1.

Fig. 5 is a left end view of the anchor and bolt as shown in Fig. 1.

Fig. 6 is a transverse sectional view taken along the line 6—6 of Fig. 4.

Fig. 7 is a transverse sectional view taken along the line 7—7 of Fig. 4.

Fig. 8 is a side view of an unexpanded bolt anchor constituting an alternative embodiment of the invention.

Fig. 9 is a longitudinal vertical sectional view of the anchor as shown in Fig. 8.

Fig. 10 is a plan view of the anchor as shown in Fig. 9.

Referring to Fig. 1 of the drawing, 10 represents a concrete wall having a hole 12 therein. A bolt 14 extends into the hole 12 and serves to engage a plate 16 or other member to be held in place. The bolt 14 engages an anchor to which the invention more particularly relates. For convenience of description, but without limitation, the terms "right" and "left" will be used in referring to the positions of the several parts.

The anchor as shown in Figs. 1 to 7 includes radially expansible gripping means. More specifically, the gripping means comprise two similar but somewhat different radially movable expansion or gripping members 18 and 20. The two members cooperate to substantially surround the bolt 14 and they are adapted to be located within the annular space between the bolt and the surface of the hole 12. When the members 18 and 20 are in their inner positions, their adjacent edges are in contact or substantially in contact as shown in Fig. 6. The said members are preferably provided respectively with longitudinal slots 22 and 24 which are open at their left ends and closed at their right ends. The slot 22 provides the member 18 with two tongues 26 and 28 and the slot 24 provides the member 20 with two tongues 30 and 32. The tongues 26, 28, 30 and 32 of the members 18 and 20 are provided with longitudinally spaced circumferentially extending teeth 34, 34 which are adapted to engage the surface of the hole 12 when the said members are moved outwardly as hereinafter explained.

The members 18 and 20 are semicylindrical at their right ends. One member which may be the member 18 is provided with an arcuate groove 36 and the other member which may be the member 20 is provided with a shorter arcuate groove 38. The member 20 is provided with integral tabs 40 and 42 which enter the groove 36 and which are curved inwardly so as to serve to loosely retain the two members in engaged relationship.

A suitable wedging means is provided, and as shown the said wedging means is a nut 44 which is internally threaded to receive and fit the threaded portion of the bolt 14. The nut 44 is initially at the left as shown in Figs. 1 and 4. The nut 44 is square in transverse section and it is tapered with its outer faces converging toward the right. The tongues 26, 28, 30 and 32 have inclined flat inner faces which are engaged respectively with the inclined outer faces of the nut.

Preferably one of the tongue which may be the tongue 28 is provided at its left end with an inwardly extending tab 46 which is engageable with the end face of the nut 44, as clearly shown in Fig. 2. The tab 46 serves to limit relative movement of the gripping members 18 and 20 toward the right. The tab 46 is of such size that it does not engage the bolt 14 which can extend through and beyond the nut to any desired extent, as shown in Figs. 1 and 2.

In accordance with the present invention, a plurality of separate bowed spring members is provided, the said spring members being connected with the anchor and extending longitudinally and being relatively narrow. As shown, there are two oppositely disposed spring members 48 and 50 hich are respectively carried by and directly connected with the tongues 26 and 32 of the gripping members. The members 48 and 50 are formed of spring steel and are relatively stiff. The said spring members have outwardly bowed portions intermediate their ends, the said bowed portions preferably being also intermediate the ends of the gripping members. The said bowed portions are positioned for engagement with the surface of the hole within which the anchor is located.

As more clearly shown in Fig. 4, the tongues 26 and 32 are formed respectively with centrally disposed longitudinal external grooves 52 and 54 and with centrally disposed longitudinal internal grooves 56 and 58. The groove 52 extends toward the left from the arcuate groove 36 and the groove 54 extends toward the left from the arcuate groove 38. The grooves 56 and 58 are at the left with their right ends respectively adjacent the left ends of the grooves 52 and 54. Radial holes connect the left ends of the grooves 52 and 54 with the right ends of the grooves 56 and 58. Each of the spring members 48 and 50 has an outwardly bowed portion the ends of which are in the corresponding outer groove 52 or 54. Each of the said members has an offset portion which extends through the corresponding radial hole and each of the said members has a short straight portion which is within the corresponding inner groove 56 or 58. Each spring member can be assembled with its tongue by inserting its short straight portion through the corresponding radial hole and then swinging the member inwardly to the position shown. When the nut 44 is in place it engages the short straight portions of the spring members to hold the said members in the positions shown.

When the parts of the anchor are assembled with the nut 44 in its initial relative position at the left as shown in Fig. 1 and with the said nut engaged with the bolt 14, the bolt and the anchor can be inserted in a hole such as the hole 12. The tab 46 by reason of its engagement with the nut 44 insures movement of the entire anchor with the bolt. The diameter of the hole 12 is such that the bowed portions of the spring members 48 and 50 engage the surface of the said hole, the said bowed portions being partly flattened, as shown. The said bowed portions of the spring members serve as runners to guide longitudinal movements of the anchor and to centralize the anchor within the hole. The said bowed portions are in firm engagement with the surface of the hole and therefore resist longitudinal and rotative movements. The anchor is shown as substantially spaced from the entrance end of the hole 12 as is preferable, but it will be understood that if desired the anchor may be located with its right end flush with the face of the wall 10.

With the anchor and bolt located as shown in Fig. 1, the bolt 14 is turned to relatively move the nut 44 toward the right from its said initial position as shown in Fig. 1 to its gripping position as shown in Fig. 3. The bowed portions of the spring members act frictionally to resist any tendency of the main expansion or gripping members to move toward the right with the nut. The bowed portions of the spring members also serve to prevent any rotation of the entire anchor with the bolt as the bolt is turned. The edge corners of the spring member are relatively sharp and they bite into the rough surface of the interior of the hole 12 to positively prevent rotative movement. As the nut 44 is moved toward the right and toward its gripping position, the left portions of the expansion or gripping members are forced outwardly, the two tongues of each member being slightly deflected relatively to each other as they move outwardly. The teeth 34 on the tongues are forced into locking or gripping engagement with the interior of the hole and the anchor is securely held in place. The head of the bolt engages the member 16 to be held, and the turning of the bolt is continued until the member 16 is securely locked in place. As the expansion or gripping members move outwardly, the bowed portions of the spring members are additionally flattened, this being permitted by the longitudinal grooves 52 and 54. When the gripping members reach their outer positions, the bowed portions of the spring members are substantially entirely within the grooves 52 and 54.

The bowed portions of the spring member resist longitudinal movement as previously stated, but they do not positively prevent it. It is therefore possible to readily release the member 16 when desired. The bolt 14 is reversely turned to relatively move the nut 44 from its gripping position to its initial position as shown in Fig. 1. As the nut moves to the said initial position, the spring members press or bias the expansion or gripping members inwardly to the extent permitted by the nut, the said expansion or gripping members being thus moved out of engagement with the surface of the hole 12 and to the positions shown in Fig. 1. Then the bolt and the anchor can be withdrawn by applying sufficient force to overcome the frictional resistance resulting from the engagement of the bowed portions of the spring members with the surface of the hole.

Figs. 8 to 10 illustrate an alternative embodiment of the invention. These views show only the alternative anchor and do not show the bolt. Two similar radially movable gripping members 60 and 62 are provided, these being generally semi-cylindrical and having a central opening for the bolt. Preferably, the said members are annularly grooved at their peripheries and are resiliently held in the proper relationship by spring bands 64 and 66 located in the grooves.

Located adjacent the ends of the expansion or gripping members 60 and 62 are two wedge members 68 and 70. The member 68 constitutes an expansion nut and it is internally threaded to engage the threaded portion of the bolt. The member or nut 68 has an initial position at the left as shown. Except for the threads, the members 68 and 70 are generally similar. Each of the members 68 and 70 has an inner tapered portion 72 with inclined external faces which engage similarly inclined internal faces on the members 60 and 62. Each of the said members 68 and 70 also has an outer tapered portion 74 with inclined external faces which engage inwardly projecting ribs 76, 76 on the members 60 and 62. There is an offset between the portions 72 and 74 of each member and the corresponding ribs 76, 76 of the expansion members engage the offset to limit longitudinal movement of the wedge member. Preferably, each of the members 68 and 70 is also provided with oppositely disposed tapered projections 76 which are located between the members 60 and 62, the last said members being bevelled to receive the said projections.

A plurality of separate bowed spring members is provided, the said spring members being connected with the anchor. Preferably, there are two spring members 78 and 80 which are identical in shape with the spring members 48 and 50.

The expansion or gripping members 60 and 62 are provided with longitudinal external grooves 82 and 84 similar to the grooves 52 and 54 and with longitudinal internal grooves 86 and 88 similar to the grooves 56 and 58, and they are also provided with radial holes connecting the said grooves. The spring members 78 and 80 are entered in the grooves 82, 84, 86 and 88 in the manner previously described in connection with the spring members 48 and 50.

When the anchor, as shown in Figs. 8 to 10, is engaged with a bolt such as the bolt 14, the anchor and the bolt can be inserted in a hole such as the hole 12. The spring members 78 and 80 serve as previously described to guide and centralize the anchor within the hole and to resist longitudinal movement. When the bolt is turned, the threaded member or nut 68 is forced toward the right from its initial position to a gripping position. In moving toward the right the member or nut 68 is forced toward the opposite member 70 and the two expansion or gripping members 60 and 62 are forced apart and into locking or gripping engagement with the surface of the hole. When the members 60 and 62 reach their outermost locking or gripping positions, the bowed portions of the spring members are entirely flattened and lie within the grooves 78 and 80. The spring members 78 and 80 not only resist longitudinal movement, but by reason of their sharp corners prevent rotative movement of the expansion members.

As previously described in connection with the anchor shown in Figs. 1 to 7, the anchor shown in Figs. 8 to 10 can be released by reversely turning the bolt, the bowed portions of the spring members serving to press the expansion members inwardly. The bolt and the anchor can be removed by overcoming the frictional resistance offered by the spring members.

The invention claimed is:

1. A bolt anchor comprising in combination, a plurality of radially outwardly movable gripping members provided with longitudinal grooves in the outer faces thereof and having initial inner positions, a wedging nut located at least partly between the gripping members, means on said gripping members to normally maintain said nut at least partially between said gripping members, said nut being engageable with a bolt so that upon rotation of the bolt the nut is longitudinally moved relatively to the gripping members for moving the said members outwardly from their said inner positions into engagement with the surface of a hole in which the anchor is located, and a plurality of longitudinally extending narrow spring members separate from the gripping members, means for securing one end of each of said spring members to its respective gripping member to prevent relative longitudinal movement therebetween, each of said spring members having its end portions engaging the gripping members and intermediate portions that are initially bowed outwardly but are in register with the said grooves, the said bowed portions of the spring members having pressure engagement with the said surface of the said hole when the gripping members are in their said inner positions so as to guide the entire anchor for longitudinal movement in either direction upon corresponding longitudinal movement of the bolt and so as to provide frictional resistance to longitudinal and rotative movements of the gripping members when the bolt is rotated to longitudinally move the nut and the said end portions of the springs being outwardly movable relatively to the bowed portions as the gripping members are moved outwardly by the nut so as to increase the pressure of the bowed portions against the surface of the hole with a resultant increase in the said frictional resistance provided by the said bowed portions.

2. A bolt anchor as set forth in claim 1, wherein said means for securing said spring members includes a radial hole in each gripping member adjacent the nut which communicates with the said groove in the outer face and wherein each gripping member also has a longitudinal groove in its inner face adjacent the nut which communicates with the said hole, and wherein each spring member has a portion extending through the corresponding radial hole and also has a portion within the groove in the inner face of the corresponding gripping member, the last said portion of each spring member being engaged by the nut to hold the said spring member in place.

ROBERTS K. SKINNER.

References Cited in the file of this patent

UNITED STATES PATENTS

| Number | Name | Date |
|---|---|---|
| 255,199 | Schenker | Mar. 21, 1882 |
| 719,426 | Boone | Feb. 3, 1903 |
| 968,544 | Defenbaugh | Aug. 30, 1910 |
| 1,790,841 | Rosen | Feb. 3, 1931 |
| 1,855,482 | McArthur | Apr. 26, 1932 |
| 2,399,069 | Skinner | Apr. 23, 1946 |
| 2,521,065 | Kempton | Sept. 5, 1950 |